(12) United States Patent
Thomas et al.

(10) Patent No.: US 11,814,249 B2
(45) Date of Patent: **\*Nov. 14, 2023**

(54) CONVEYOR AND LOGIC SYSTEMS TO RETURN, BALANCE, AND BUFFER PROCESSED OR EMPTY TOTES

(71) Applicant: Walmart Apollo, LLC, Bentonville, AR (US)

(72) Inventors: Nicholas O. Thomas, Centerton, AR (US); Jason Scott Coyle, Rogers, AR (US); Jessica L. Solana, Bentonville, AR (US); Mustafa A. Harcar, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/575,475

(22) Filed: Jan. 13, 2022

(65) Prior Publication Data
US 2022/0135339 A1 May 5, 2022

Related U.S. Application Data

(63) Continuation of application No. 16/716,208, filed on Dec. 16, 2019, now Pat. No. 11,254,513, which is a
(Continued)

(51) Int. Cl.
*B65G 43/08* (2006.01)
*B65G 1/137* (2006.01)
*G06Q 10/08* (2023.01)

(52) U.S. Cl.
CPC ........... *B65G 43/08* (2013.01); *B65G 1/1378* (2013.01); *G06Q 10/08* (2013.01); *B65G 2203/0266* (2013.01); *B65G 2203/042* (2013.01)

(58) Field of Classification Search
CPC .................. B65G 43/08; B65G 1/1378; B65G 2203/0266; B65G 2203/042; G06Q 10/08
See application file for complete search history.

(56) References Cited

U.S. PATENT DOCUMENTS 3,776,395 A * 12/1973 Lingg .................... B64F 1/368
414/928
5,577,594 A 11/1996 Belvederi
(Continued)

FOREIGN PATENT DOCUMENTS

GB 1164168 9/1969
WO 2018144422 8/2018

OTHER PUBLICATIONS

Kutz, M., Mechanical Engineers' Handbook, vol. 3: Manufacturing and Management, 2015, pp. 535, 538, 539 (preview).
(Continued)

*Primary Examiner* — Thomas Randazzo
(74) *Attorney, Agent, or Firm* — Fitch, Even, Tabin & Flannery, LLP

(57) ABSTRACT

In some embodiments, apparatuses and methods are provided herein useful to automatically balance and buffer the return of empty containers or other totes to a plurality of areas. In some embodiments, a control circuit employs a logic system in which empty totes are directed along primary, secondary, or tertiary paths depending on information gathered from sensors regarding the availability of space for empty totes at a plurality of potential destinations. In this way, the return of empty totes to one or more points of origin may be buffered to balance the number of empty totes in one or more areas.

18 Claims, 10 Drawing Sheets

Related U.S. Application Data continuation of application No. 15/883,248, filed on Jan. 30, 2018, now Pat. No. 10,507,975.

(60) Provisional application No. 62/453,750, filed on Feb. 2, 2017.

(56) References Cited

U.S. PATENT DOCUMENTS

| | | | | |
|---|---|---|---|---|
| 5,715,660 | A | 2/1998 | Balentine | |
| 6,619,463 | B2 | 9/2003 | Tulley | |
| 8,335,585 | B2* | 12/2012 | Hansl | B65G 1/1378 700/214 |
| 10,507,975 | B2* | 12/2019 | Thomas | G06Q 10/08 |
| 11,254,513 | B2* | 2/2022 | Thomas | B65G 1/1378 |
| 2009/0000912 | A1* | 1/2009 | Battles | B65G 1/1371 700/215 |
| 2009/0299521 | A1* | 12/2009 | Hansl | B65G 1/1373 700/215 |
| 2011/0130869 | A1* | 6/2011 | Linge | B65G 1/1378 700/218 |
| 2011/0259715 | A1* | 10/2011 | Morgott | B65G 1/1378 198/459.5 |
| 2012/0101627 | A1* | 4/2012 | Lert | B65G 1/1373 700/216 |
| 2015/0104286 | A1 | 4/2015 | Hansl | |
| 2015/0125249 | A1 | 5/2015 | Joice | |
| 2015/0274325 | A1 | 10/2015 | Lykkegaard | |
| 2016/0194153 | A1* | 7/2016 | Issing | G06Q 10/0832 700/216 |
| 2018/0290829 | A1* | 10/2018 | Schroepf | G06Q 50/28 |

OTHER PUBLICATIONS

Pacline Overhead, Overhead Conveyors for Empty Carton and Tote Handling, https://www.pacline.com/solutions/empty-carton-handling-systems/, Jul. 27, 2016, 5 pp.

Patent Cooperation Treaty, International Searching Authority, Notification of the International Search Report and the Written Opinion of the International Searching Authority, or the Declaration issued in International Application No. PCT/US18/15856, dated Apr. 19, 2018, 11 pp.

Richards, Gwynne, Warehouse Management: A Complete Guide to Improving Efficiency and Minimizing Costs in the Modern Warehouse, Kogan Page Pubishers, Jun. 3, 2014, Excerpt from Section 5, 2 pp. (pp. 147-148).

U.S. Appl. No. 15/883,248; Notice of Allowance dated Aug. 15, 2019; (pp. 1-10).

U.S. Appl. No. 15/883,248; Office Action dated Feb. 14, 2019; (pp. 1-14).

U.S. Appl. No. 16/716,208; Non-Final Rejection dated Oct. 14, 2021; (pp. 1-10).

U.S. Appl. No. 16/716,208; Notice of Allowance dated Nov. 1, 2021; (pp. 1-10).

Vanderlande, "Vanderlande's Logistics System at EDEKA Sudwest", https://www.youtube.com/watch?v=lw6fu0l9o1l, published on Aug. 27, 2015, pp. 1-9 (prewiew).

\* cited by examiner

CONVEYOR AND LOGIC SYSTEMS TO RETURN, BALANCE, AND BUFFER PROCESSED OR EMPTY TOTES

CROSS-REFERENCE TO RELATED APPLICATION(S)

This application is a continuation of U.S. application Ser. No. 16/716,208, filed Dec. 16, 2019, which is continuation of U.S. application Ser. No. 15/883,248, filed Jan. 30, 2018, now U.S. Pat. No. 10,507,975, which claims the benefit of U.S. Provisional App. No. 62/453,750, filed Feb. 2, 2017, each of which is incorporated herein by reference in its entirety.

TECHNICAL FIELD

This invention relates generally to systems and apparatus for conveying crates, boxes, pallets, containers, or other totes, as well as logic systems for determining where the totes are to be delivered and for determining how to automatically convey them to their destination.

BACKGROUND

In warehouses and other storage facilities, large stores, and factories, there are often specified areas for filling boxes, carts, containers, palettes, or other totes for carrying various goods. One example is a "picking area," in which goods received by the facility are sorted into or onto totes for delivery to another area. These totes are conveyed to a second area, often by an automated system of conveyors, and at the second area unloaded so that the goods may be further processed. For instance, the second area may be a consolidation area, where goods are removed from the tote and consolidated with goods of the same type for storage, use, or display. In such systems, the empty totes are stacked and then manually carried or driven by forklift back to their point of origin. If there are multiple picking areas, one picking area may experience a shortage of empty totes, and workers in that area may request that excess totes be manually gathered from a different picking area. There are no known systems in place for automatically distributing empty totes to one or more filling or picking areas on an as-needed basis so that a baseline number of empty totes is maintained.

U.S. Pat. No. 5,715,660 describes a station with two adjacent vertical conveyors, one for supplying empty containers to the station, and one for removing and unloading filled containers. The device may include sensing circuitry to determine when a container located at the station is full, but the system simply removes full containers and replaces them with empty containers without determining whether to direct empty containers to a different destination when the station is occupied. U.S. Patent Application 2015/0125249 describes a vertical stacking device for stacking empty containers from a plurality of empty container stations, but the disclosed system only sends empty containers to a single destination to be stacked and then removed as a stack. There remains a need for an automated system to efficiently manage and distribute empty totes as needed at one or more points within the system.

BRIEF DESCRIPTION OF THE DRAWINGS

Disclosed herein are embodiments of systems, apparatuses and methods pertaining to management of empty totes in order to balance and buffer the delivery of empty totes to a plurality of potential destinations. This description includes drawings, wherein.

Figure 1:
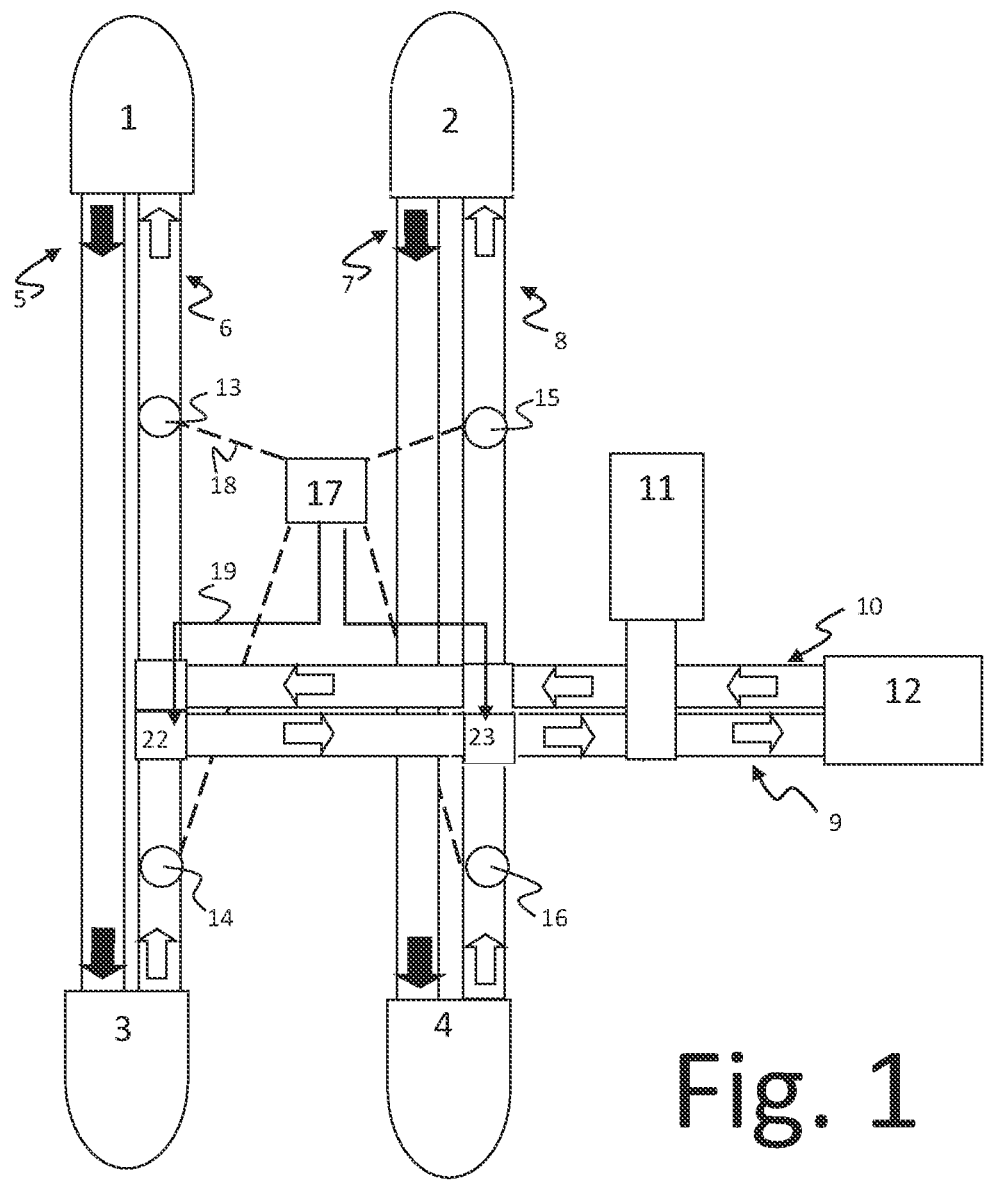
FIG. 1 is a schematic drawing of a conveyor system including a tote return system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, and pursuant to various embodiments, systems, apparatuses, and methods are provided herein that are useful to automatically balance and buffer the return of empty totes as needed to either an area in which they are to be filled or to an alternative destination, such as a storage area or alternative filling area. After full totes are conveyed by a conveyor line to a first area from a second area and are emptied at the first area, they are automatically returned to the second area for re-filling if empty totes are needed at that location. If the filling area has reached a specified capacity of empty totes, or in some cases if there is a greater need for totes at a different filling station, the empty totes may be instead diverted by a buffer component from the conveyor line to another filling station. Multiple filling stations and/or multiple emptying stations may be linked in a single system, with any desired ratio of filling stations to emptying stations. Preferably, the system interconnects from two to six filling stations with two to six emptying stations. Each emptying station may be coupled to one or more filling stations, but need not necessarily be directly connected to multiple filling stations. Likewise, each filling station may be coupled to one or more emptying stations, but need not necessarily be directly connected to multiple filling stations. If the system determines that all or some of the filling stations have no immediate need for additional totes, the empty totes may instead be directed to a loop to return the totes to an upstream position, transfer line leading to a different area, tote storage (e.g. a stacking device), or other alternative location. In some embodiments, the system includes a conveyor line connecting a filling area to emptying area, a sensor configured to detect a need for empty totes at the second area, a buffer component coupled to the conveyor line, and a control circuit configured to signal the buffer component to direct the empty totes to the filling area when the sensor detects a need for empty totes at the filling area and to signal the buffer component to direct at least one empty tote to an alternative destination when the sensor does not detect a need for empty totes at the second area.

In another form, methods for distributing empty totes from a first area are provided that include moving empty totes along a conveyor line connecting the first area to a filling area, receiving at a control circuit signals from a sensor configured to detect the presence or absence of a tote at a specified location in the filling area, and communicating a transfer signal from the control circuit to a transfer device when the sensor detects the presence of a tote at the specified location, the transfer signal effective to cause the transfer device to direct empty totes from the conveyor line to a buffer component.

In some embodiments, the systems and methods described herein reduce labor hours and time necessary to balance the numbers of totes. Automation of empty tote return allows throughput to increase without a corresponding increase in labor and other costs for balancing totes across a conveyor system. Further, it offers a system for balancing totes evenly across multiple destinations in a way that is not possible when manually returning totes, and offers dramatically increased speed relative to traditional systems. In some embodiments, the system may return and balance a number of empty totes that would normally require about 5-10 human employees per shift. The speed with which totes are returned may vary, but in some embodiments the system may have the capacity to move about 1,000 totes or more over each transfer point. Limits may be set on the number of totes passing by a single transfer point in a given amount of time, with sensors near transfer points tracking the number of totes passing by and transmitting signals relating to traffic in specified areas in order to cause the system to reduce the speed with which totes are transferred if necessary.

In some embodiments, the totes referenced herein may be any devices or structures for holding or supporting one or more items during conveyance. The term "tote" may refer to, without limitation, a box, crate, basket, container, drum, barrel, cage, tray, pallet, platform, rack, bag, or other device suitable for use in transporting goods. Totes may be of any shape or size suitable for conveyance on the conveyor line. Totes may be open, closed, or partially closed, and may support items thereon, suspend items therefrom, hold items in an interior space, or secure items to its exterior. Totes may be rigid or flexible. Preferably the conveyor lines convey a plurality of the same or similar totes, although different totes may also be used on the same conveyor line in some embodiments.

In one form, the conveyor line linking the first area to the second area may be a belt conveyor, roller conveyor, chain conveyor, or any other known type of conveyor of transport line. The line may include one or more conveyor devices and one or more transfer points. The conveyor may underlie the totes that it conveys, or may be overhead, such as a hook conveyor system. Depending on the relationship between the first area and the second area, the conveyor line may be horizontal, vertical, both horizontal and vertical, and/or an assembly of various horizontal and vertical components.

In some embodiments, the buffer component redirects totes from the empty tote return conveyor line in response to signals from the control circuit. The buffer component may be activated, for instance, when the filling area is no longer in need of empty totes or when another area has a greater need for empty totes. The buffer component may be a transfer device (e.g. right angle transfer device, pop-up device, lift-and-transfer device, roller belt device, tooth belt device, transfer chute, or other mechanism for shifting items to a different conveyor or providing branching paths). In addition, or alternatively, the transfer device may include or lead to a transfer conveyor line, storage area (e.g. dense storage area and/or tote stacking device), or other mechanism for moving totes from the conveyor line to an alternative route or destination.

In some embodiments, the system may utilize one or more sensors to determine if there is a need for empty totes at the second area and/or to determine if there is an excess of totes at the second area or at some point along the conveyor line. One or more sensors may be positioned in or near the area in which totes are filled to determine when totes are present or absent, or even to determine the number of totes present in a location. Sensors may be alternatively, or additionally, positioned at one or more points along the conveyor line to determine the position(s) of totes and/or determine when the conveyor line is substantially full of empty totes. For instance, a plurality of sensors may be placed in spaced apart relationships along then entire conveyor line to determine how many totes are present on the conveyor line. The sensors may be of any type, including an optical sensor, pressure or weight sensor, acoustic sensor, chemical sensor, magnetic sensor, thermal sensor, tripwire, physical switch or lever, or any other device capable of detecting the presence or absence of totes at a given location. A combination of different sensors may also be used. Sensors may be located anywhere that allows them to detect the presence or absence of totes, for instance above, below, or beside conveyors. In some embodiments, sensors may be located below the conveyors, detecting totes through openings between roller conveyors or at joints between belt conveyors. In some embodiments, the sensors may be under-mounted ILTs. In some embodiments, sensors may be placed throughout the system at regular intervals, such as every 12, 24, 36, or 48 inches so that the capacity of any given area can be readily increased or decreased by assigning different sensors as capacity markers. For instance, any one of dozens of sensors proximate the end of a conveyor line may be assigned as the maximum capacity marker at any given point in time, with a second sensor half-way to the end then indicating 50% capacity, and a third sensor between the first and second sensors indicating 75% capacity.

In some embodiments, the sensor is configured to directly or indirectly signal information regarding the presence and/or absence of totes at a given location to a control circuit. The control circuit may be of any processor-based or electronic computer-type device known in the art for processing information and receiving signals and transmitting control signals in response to the received signals.

The term control circuit refers broadly to any microcontroller, computer, or processor-based device with processor, memory, and programmable input/output peripherals, which is generally designed to govern the operation of other components and devices. It is further understood to include common accompanying accessory devices. These architectural options are well known and understood in the art and require no further description here. The control circuit may be configured (for example, by using corresponding programming stored in a memory as will be well understood by those skilled in the art) to carry out one or more of the steps, actions, and/or functions described herein. Generally, the control circuit and/or electronic components of a related interface device can include fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit and a computer memory may be integrated together, such as in a microcontroller, application specification integrated circuit, field programmable gate array or other such device, or may be separate devices coupled together.

The control circuit may comprise multiple subsystems. For instance, in some embodiments local control mechanisms may govern decisions at each buffer point and/or identify errors or jams in the system, with an overall control mechanism communicating with and coordinating each local control mechanism. In some embodiments individual local control systems may be shut off in order to repair or address other problems in a given area, and the overall control system may bypass that area without shutting down other local control systems.

In some embodiments, the empty tote return, buffer, and transfer system automatically transfers and balances a quantity of totes between, for instance, a picking area, consolidation, area, and storage area. The system may include transport from consolidation that transports empty totes to a decision point where the tote can be directed to a picking area, a transfer line, or a storage area. The transfer line may serve as both a tote buffer and a transfer mechanism between the transport conveyance from consolidation, storage area, and transport conveyance to the picking area. The storage area may function as a dense storage mechanism for empty totes, and may be comprised of a series of conveyor systems, one or many tote stackers, or other mechanisms that facilitate the storage of totes. A transport conveyance to the picking area may transport empty totes from transfer lines, storage, or directly from consolidation. Empty totes may be buffered for picking associates and pass through each destination in the picking area.

In some embodiments, a logic or control system directs the movement and flow of totes within the system, and may comprise a control circuit coupled to one or more sensors configured to detect the presence or absence of totes. The control system sends signals instructing transfer mechanisms to shift totes to specific conveyances in response to signals received from the one or more sensors. The system is designed to be flexible, and permits totes processed at any number of processing stations to be automatically transferred depending on the status of other totes within the system. Multiple inputs and outputs of the system may be balanced through the use of one or more transfer and/or buffering components. Independent buffer components may be configured to work in unison in accordance with the systems logic, so that any conveyor in the system can become an input into one or more storage units or one of multiple outputs. The control system may orchestrate movement between physical elements of the systems based on detected information and built-in logic to ensure that there is a balanced number of empty totes on each line. The empty tote management system may have physical connections between all conveyor lines so that totes from any input may be directed to any output, allowing balancing of totes across each and every line. When one area does not contain a minimum threshold of empty totes, the system logic may cause empty totes to be delivered to that area. Similarly, when one area contains totes in excess of a maximum threshold, system logic may direct totes away from that area. If all destinations are above the minimum threshold of empty totes, additional empty totes may be either directed on the most direct path for their default output area or, alternatively, to a storage area, depending on the system logic implemented.

Referring to FIG. 1, a warehouse distribution system is shown in which two picking areas 1 and 2 at which items are picked and placed into totes are connected to respective consolidation areas 3 and 4 by parallel conveyor lines 5 and 7. While the system shown in FIG. 1 depicts a 1:1 ratio of picking areas to consolidation areas, it should be noted that the number of picking areas need not mirror the number of consolidation areas, and any number of picking areas and consolidation areas may be provided with each picking area and consolidation area connected to any number of other areas. Totes filled with picked items are conveyed from picking area 1 to consolidation area 3 along conveyor line 5, and from picking area 2 to consolidation area 4 along conveyor line 7. Solid arrows show the direction of transport for full totes. When totes are emptied at consolidation areas 3 and 4, the empty totes are returned to the picking areas via conveyor lines 6 and 8, respectively. Outline arrows show the direction of transport for empty totes along conveyor lines 6 and 8. Sensors 13 and 15 detect whether there is available space for additional empty totes at picking areas 1 and 2, respectively. When sensor 13 detects that there is no longer a need for additional totes at picking area 1, for instance by detecting that a tote is physically present at the entrance to picking area 1, sensor 13 sends a signal to a control circuit 17 to activate a buffer component to divert additional totes away from picking area 1. Sensor 13 may be coupled to the control circuit 17 by a hard-wire connection, wireless connection, or any other manner known in the art. Alternatively, the buffer component may be activated by default and de-activated when the sensor 13 detects that there is space available at picking line 1 for additional empty totes.

The buffer component shown in FIG. 1 includes a transfer line 9 connecting return conveyor line 6 to return conveyor line 8, and also leading to an alternative destination 12 and a dense tote storage area 11. Totes may be shifted to transfer line 9 by any known device, including various types of pop-up transfer devices and right-angle transfer devices. Alternative destination 12 may comprise an unlimited number of components providing an unlimited number of alternative destinations for the empty totes, and may be, for instance, a third picking area or one or more additional return conveyor lines connecting additional picking areas to additional consolidation areas.

In FIG. 1, when sensor 13 indicates that there is no need for empty totes at picking area 1 (e.g. when picking area 1 is full), control circuit 17 will divert totes being delivered along return conveyor 6 to transfer conveyor 9. If sensor 15 indicates that there is a need for empty totes at picking area 2, the control circuit 17 may be programmed to signal a transfer device to shift totes from transfer line 9 to return conveyor line 8 so that empty totes are directed to picking area 2 rather than picking area 1. If and when sensor 15 indicates that empty totes are no longer needed at picking area 2, totes will be allowed continue along transfer line 9 toward an alternative destination 12 unless sensor 13 alerts the control circuit to a need for empty totes detected at picking area 1.

One or more sensors positioned to detect a need for empty totes at alternative destination 12 may be configured to signal the control circuit when empty totes are no longer needed at alternative destination 12, and the control circuit will accordingly redirect empty totes from transfer line 9 to a dense tote storage area 11 via a transfer device, such as a pop-up transfer device or right-angle transfer device. Totes may be stacked or nested at the dense storage area, for instance in a magazine-like chamber, and may be reintroduced to return line 6 or 8 via return transfer line 10. Transfer lines 9 and 10 optionally may be omitted so that transfer devices shift empty totes directly to dense tote storage area 11.

In a similar process, empty totes returning to picking area 2 along return conveyor 8 may be redirected to picking area 1, alternative destination 12, or storage area 11 depending on the signals transmitted by sensor 15 and a sensor for alternative destination 12, which are configured to detect the need for totes at those locations.

Figure 2:
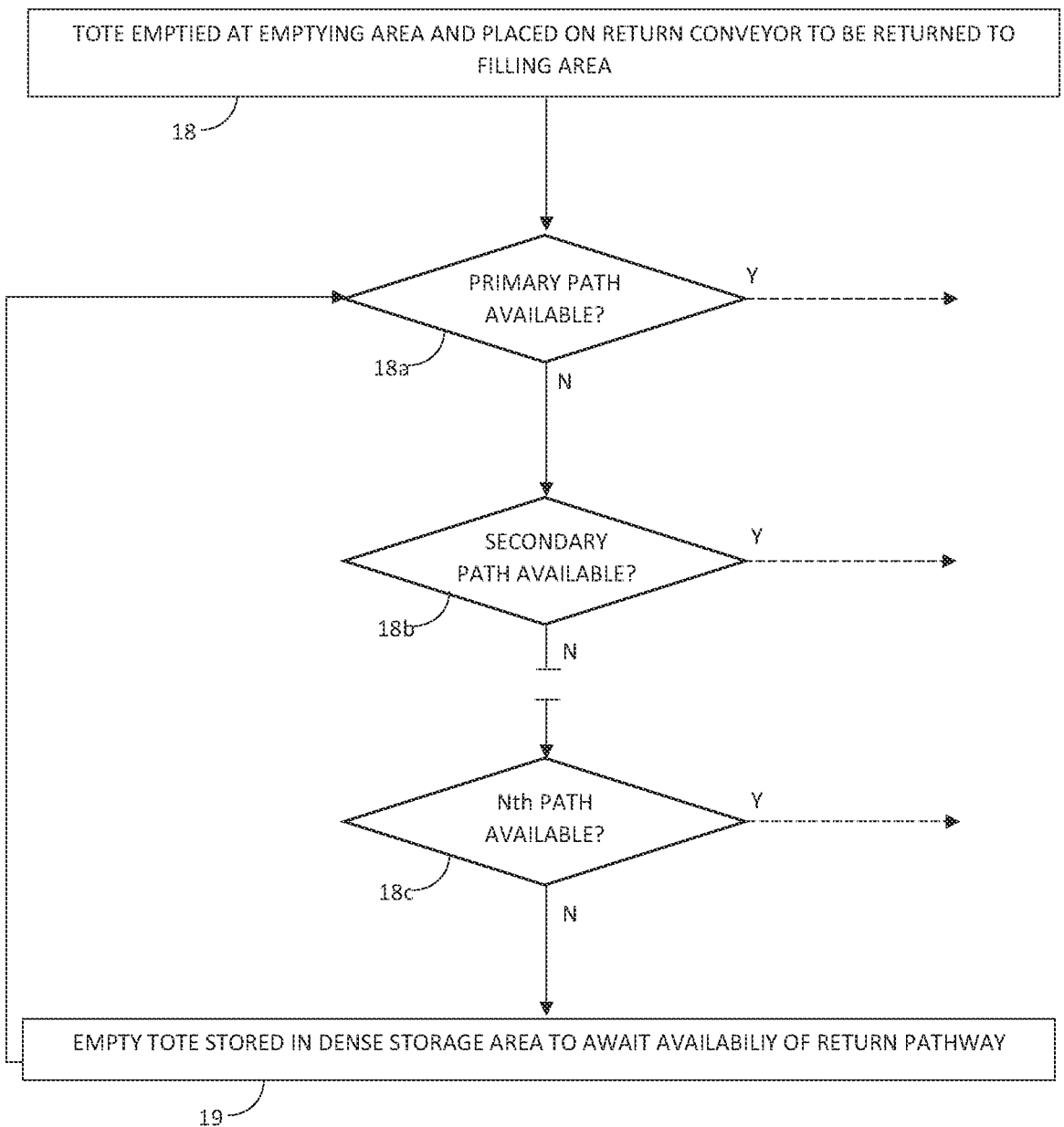
FIG. 2 is a flow chart showing a basic logic system for determining the return path of empty totes in accordance with several embodiments.

FIG. 2 is a basic logic diagram illustrating steps of one embodiment of a method of managing empty totes. The embodiments of the method of FIG. 2 may be performed by the components of the system 100 of FIG. 1 or other systems. The illustrated method begins with a user or automated device emptying a tote at an emptying area and placing the empty tote on a return conveyor (step 18). A control circuit (e.g. control circuit 17 in FIG. 1 or a suitable control circuit of another system) coupled to sensors in various locations sequentially determines the availability of prioritized paths to determine the route to be taken by the empty tote. First, the control circuit determines whether a primary path is available (Step 18a) by detecting the presence or absence of totes at a given location. If the primary path is available, the control circuit will send signals causing the empty totes to be directed along the primary path. Assuming the primary path is not available, the control circuit determines if a secondary path is available (Step 18b) by detecting the presence or absence of totes at a given location along the secondary path. If the secondary path is available, the control circuit will send signals causing the empty totes to be directed along the secondary path. If the secondary path is unavailable, the control circuit will determine if additional paths are available. This process may be repeated for N number of alternative paths (Step 18c) until it is determined that paths 1 to N are unavailable. When the Nth path is unavailable, the control circuit directs totes to a dense storage where the totes are stacked for later use (Step 19). The control circuit continues to monitor pathways 1 through N, and when a pathway becomes available will direct totes from the dense storage area to the available pathway. For instance, FIG. 2 shows the control circuit returning to Step 18a after storing a tote in the dense storage area (Step 19). However, it should be noted that the control circuit may alternatively be configured to return directly to Step 18b or 18c after Step 19, and need not re-assess the availability of all available return paths.

Figure 3:
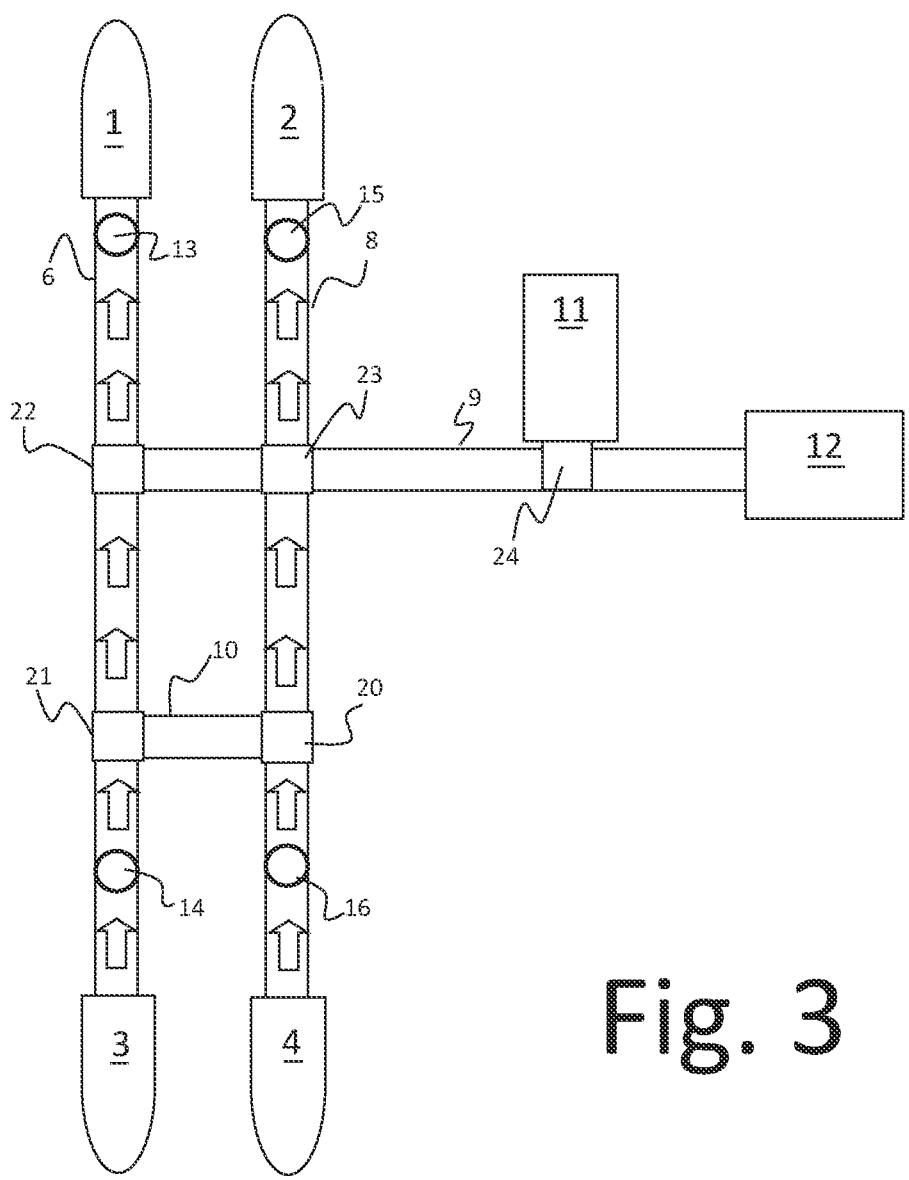
FIG. 3 is a schematic depicting a tote return system in accordance with some embodiments, depicting a state in which two filling areas are in need of empty totes.

FIG. 3 shows an example of a default state of a partial empty tote management, buffering, and balancing system where a first conveyor line 6 returns empty totes to picking area 1 from consolidation area 3 and conveyor line 8 returns empty totes to picking area 2 from consolidation area 4. Certain details shown in FIG. 1 are omitted from this figure for purposes of clarity. In the default state, totes are conveyed directly from consolidation area 3 to picking area 1 and from consolidation area 4 to picking area 2. The flow of empty totes may be buffered by one or more buffer components. For instance, transfer devices 20 and 21 are connected by transfer conveyor 10, and may be instructed by the control circuit to redirect totes from one conveyor line to the other. Similarly, downstream transfer devices 22 and 23 may redirect totes between lines along transfer conveyor 9. Transfer conveyors 9 and 10 may be unidirectional or may be able to change direction based on the desired path of totes, and may be coupled with additional conveyor lines to increase the variety of potential routes available.

As shown in FIG. 3, sensors 13 and 15 indicate that picking areas 1 and 2, respectively, have room for additional empty totes. As a result, empty totes are routed from consolidation areas 3 and 4 along direct paths, as indicated by outline block arrows. Transfer lines 9 and 10 are not active in this state.

Figure 4:
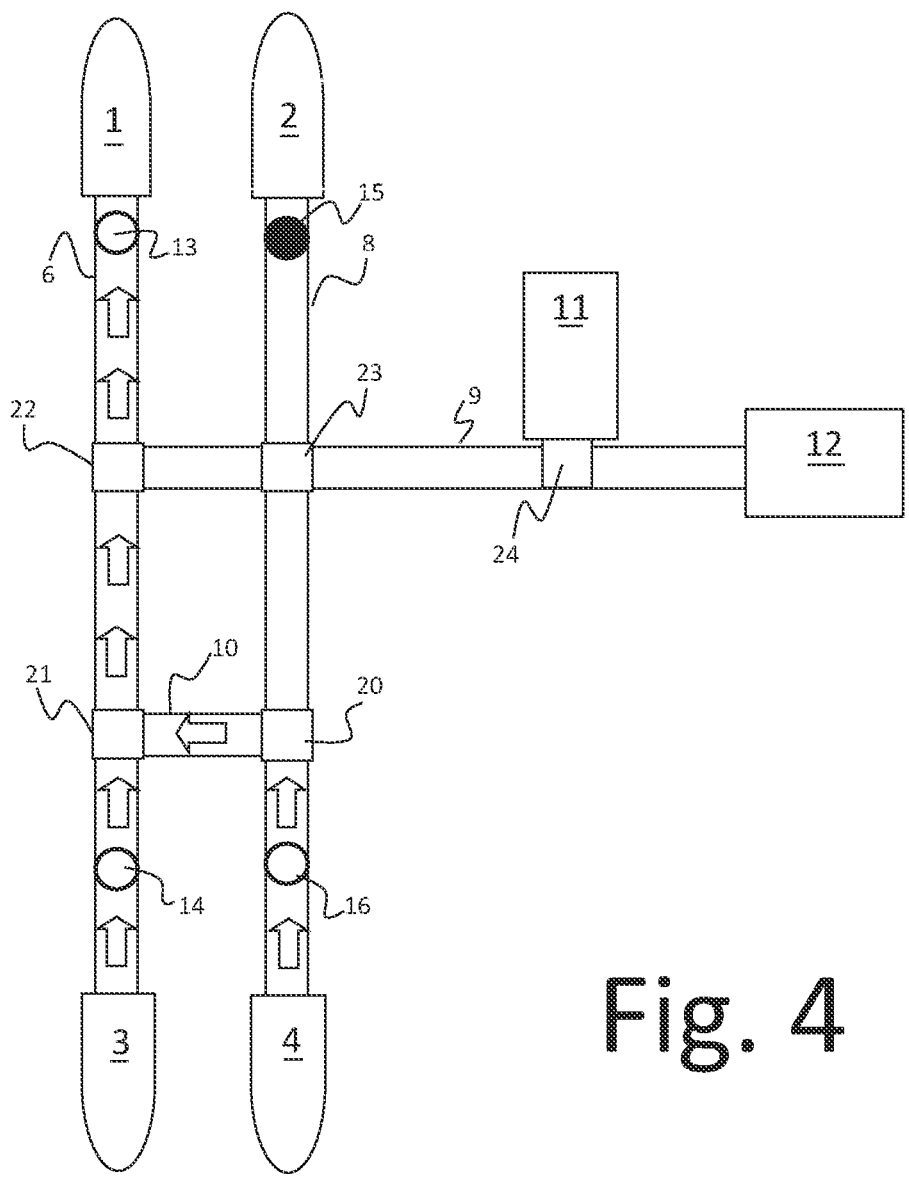
FIG. 4 is a schematic depicting a tote return system in accordance with some embodiments, depicting a state in which one filling area is in need of empty totes and another filling area has reached or exceeded a predetermined capacity.

FIG. 4 depicts an alternative state of the system shown in FIG. 3, in which sensor 15 indicates that picking area 2 is full. FIG. 15 sends a signal to the control circuit indicating that picking area 2 is no longer in need of empty totes. As a result, the control circuit assesses whether a secondary path is available. In this case, the control circuit determines whether picking area 1 is in need of empty totes. Sensor 13 located at picking area 1 indicates that the picking area is not full, and as a result the control circuit directs transfer device 20 to direct empty totes from consolidation area 4 along transfer conveyor 10, as shown by arrows, and they are merged by transfer device 21 with totes from consolidation area 3 along conveyor line 6. Totes from consolidation area 3 continue on a path straight through transfer devices 21 and 22 to picking area 1 as long as sensor 13 indicates that picking area 1 is not full. When sensor 15 indicates that picking area 2 is no longer full, the control circuit will instruct transfer device 20 to begin once again directing totes from consolidation area 4 along conveyor line 8 to picking area 2.

Figure 5:
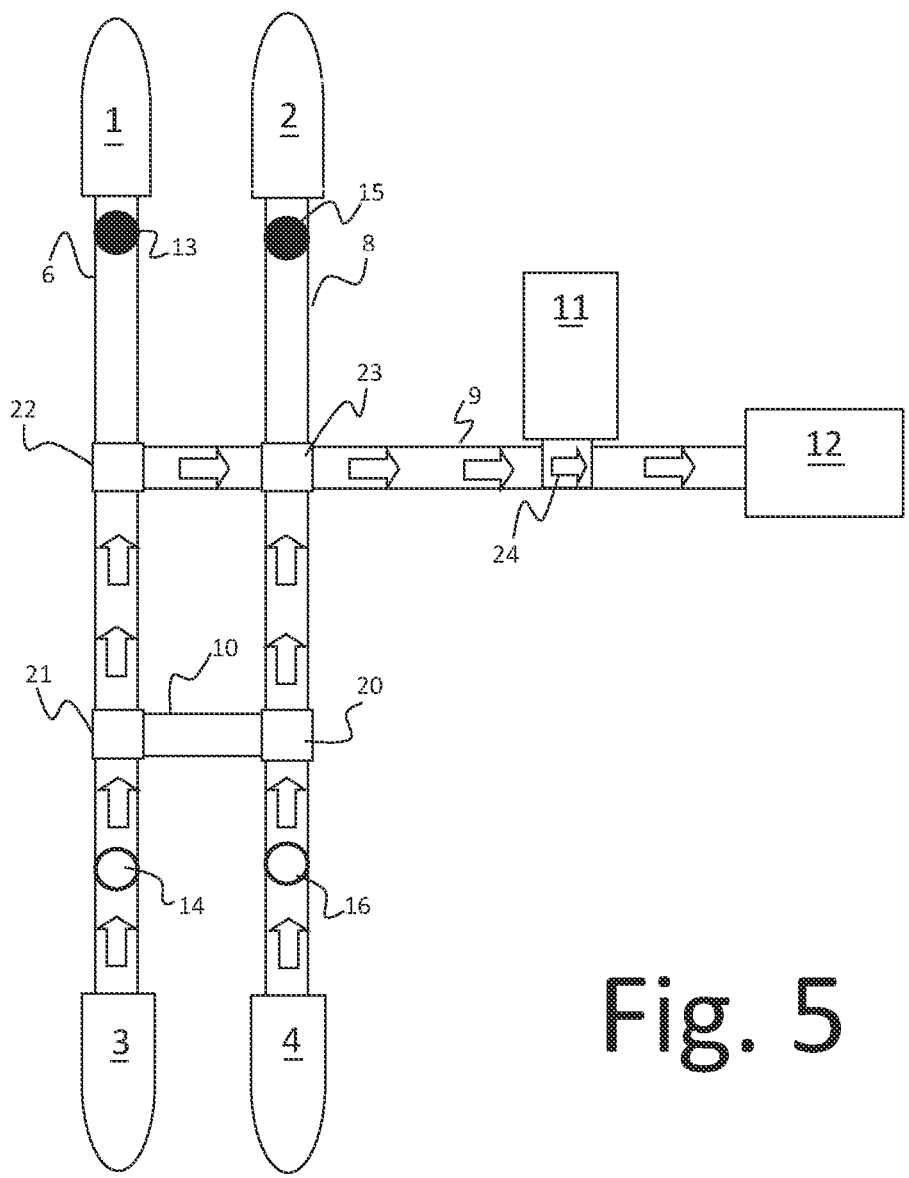
FIG. 5 is a schematic depicting a tote return system in accordance with some embodiments, depicting a state in which two filling areas have reached or exceeded a predetermined capacity of empty totes, and additional empty totes are re-routed to an alternative conveyor line.
Figure 6:
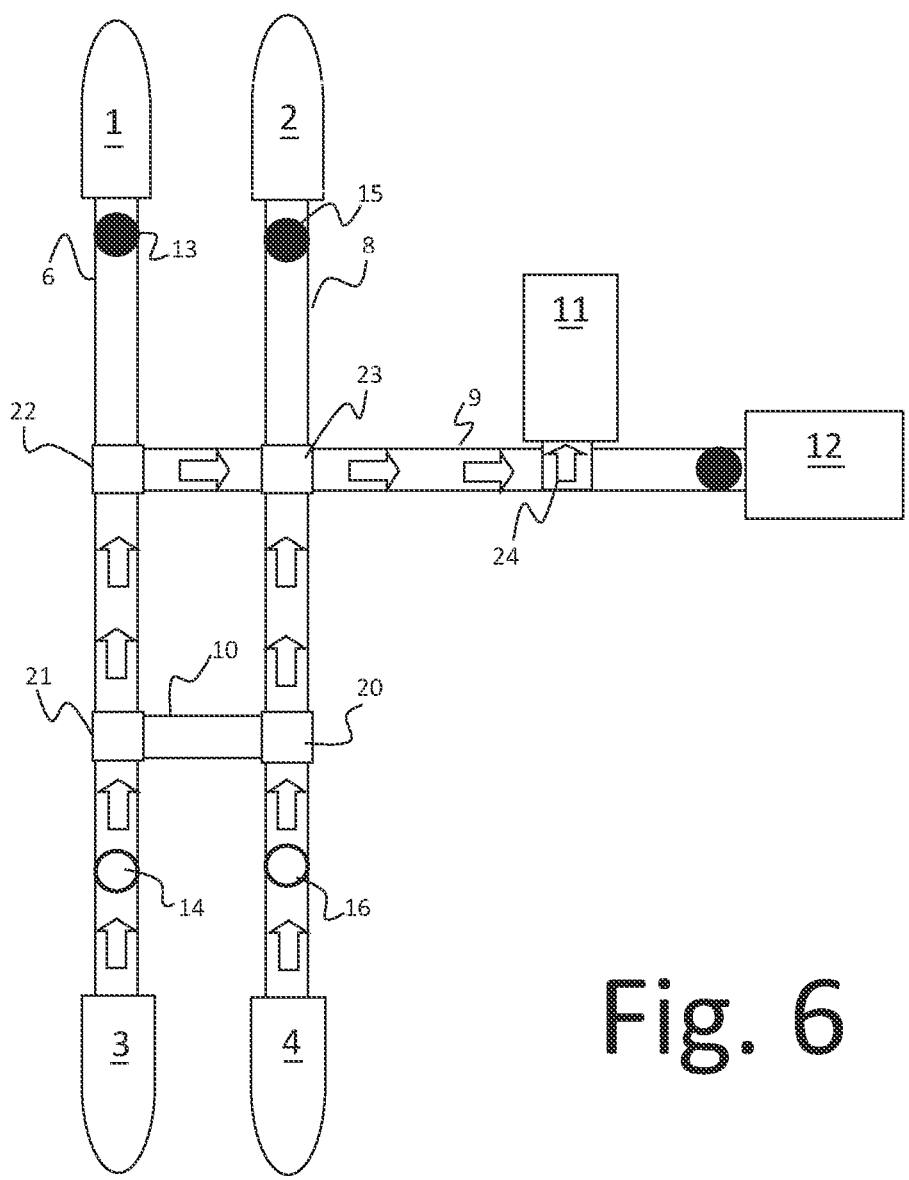
FIG. 6 is a schematic depicting a tote return system in accordance with some embodiments, depicting a state in which two filling areas and an additional alternative destination have all reached or exceeded a predetermined capacity of empty totes, and additional empty totes are re-routed to a storage area.

In FIG. 5, sensors 13 and 15 indicate that both of picking areas 1 and 2 have reached a maximum capacity for empty totes. In response, the control circuit directs transfer devices 22 and 23 to direct totes from both of lines 6 and 8 along transfer conveyor 9. If the control circuit receives signals indicating that an alternative destination 12 is available, totes from consolidation areas 3 and 4 will be directed through transfer device 24 to the alternative destination 12, which may be one or more picking areas, one or more additional conveyor lines, or another area in which empty totes may be utilized or directed to different areas. If and when the control circuit detects that the alternative destination 12 is no longer available, as in FIG. 6, the control circuit will instruct transfer device 24 to instead direct totes travelling along transfer conveyor 9 to a dense tote storage 11, where they may be stored until sensors indicate a need for empty totes at one or more destinations.

Figure 7:
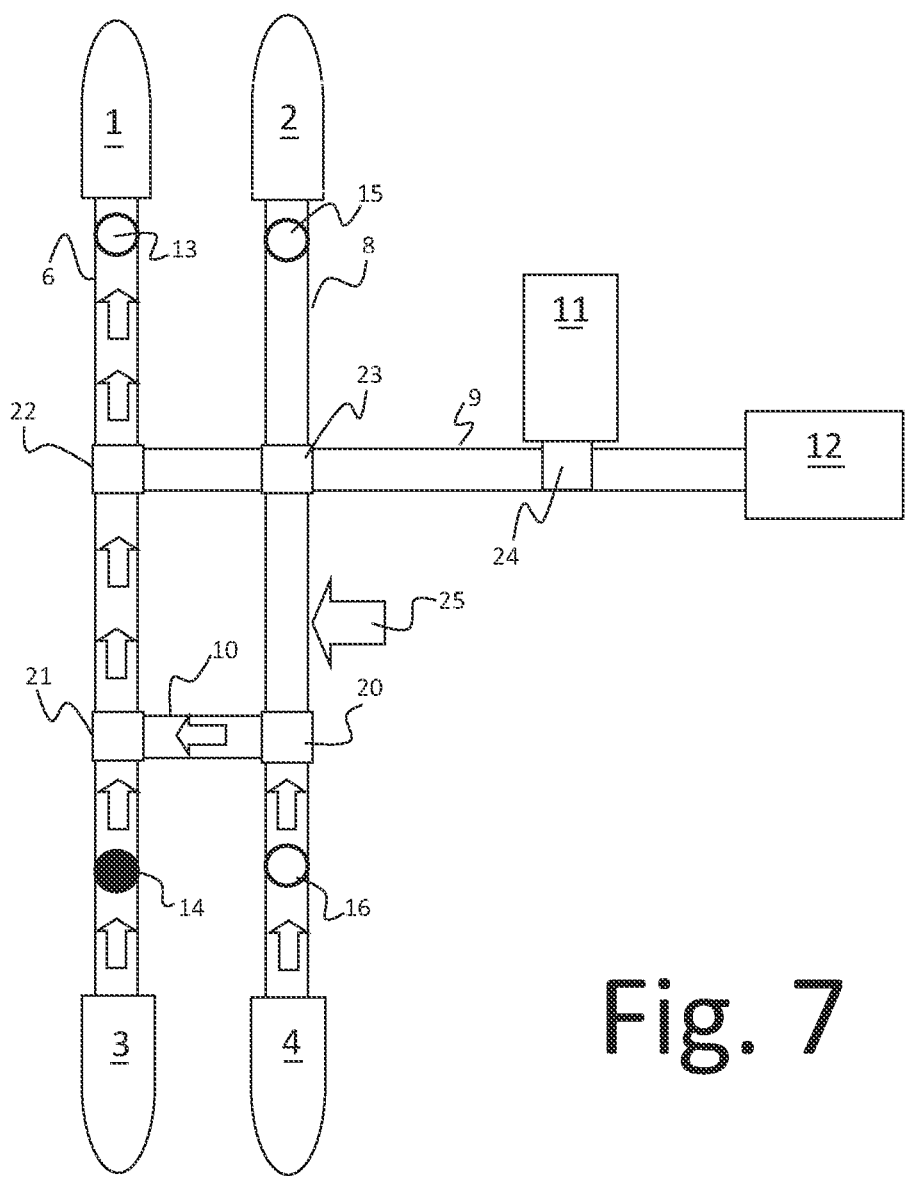
FIG. 7 is a schematic depicting a tote return system in accordance with some embodiments, depicting a state in which a first conveyor line is full and a second conveyor line receives additional empty totes from another source.

FIG. 7 shows the empty tote management system of FIG. 3 in a state in which picking areas 1 and 2 need empty totes, but conveyor line 6 is full as indicated by sensor 14. In addition, additional totes are provided to conveyor line 8 at a point 25 downstream from transfer device 20. In response to the influx of totes at point 25, the control circuit instructs transfer device to alter the primary path of totes from consolidation area 4 so that they are conveyed along transfer line 10 to conveyor line 6 and merged with the stream of totes conveyed from consolidation area 3, as shown by arrows. When sensor 14 indicates that conveyor line 6 is full, the control circuit may instead instruct transfer device 20 to redirect totes from consolidation area 4 straight through along line 8, the former default path. If sensor 16 begins to indicate that line 8 is backed up with empty totes, transfer device 23 may be directed to clear line 8 by temporarily redirecting some or all totes along transfer line 9, unless sensor 14 indicates that line 6 has cleared, in which case the control circuit will signal transfer device 20 to again begin directing empty totes from consolidation area 4 to conveyor line 6 via transfer line 10.

Figure 8:
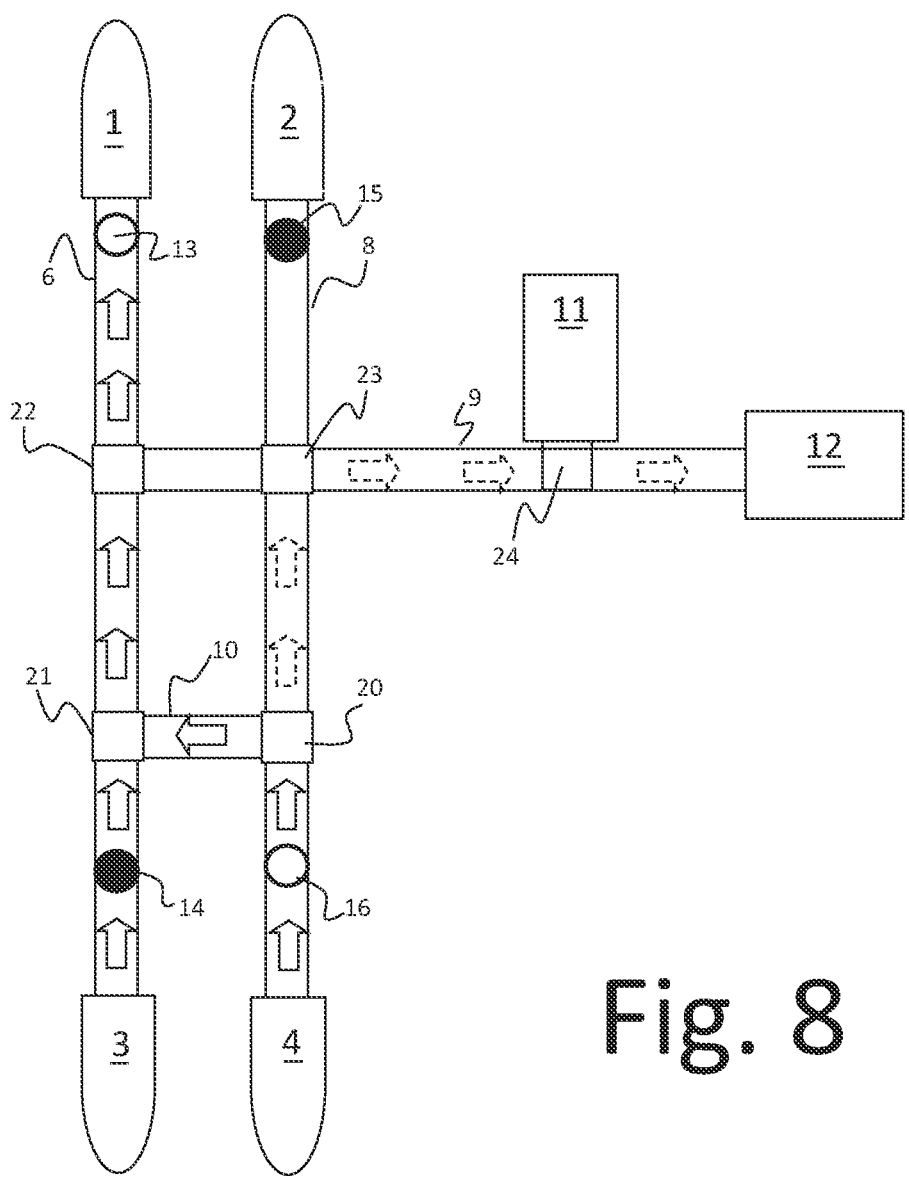
FIG. 8 is a schematic depicting a tote return system in accordance with some embodiments, depicting a state in which a first conveyor line is full and a second conveyor line leads to a filling area that has reached or exceeded a predetermined capacity of empty totes.

In FIG. 8, sensor 15 indicates that picking area 2 is full, causing transfer device 20 to direct totes from consolidation area 4 along a secondary path to conveyor line 6, as shown by arrows with solid outline. However, when sensor 14 indicates that conveyor line 6 is full, the control circuit will begin directing totes from consolidation 4 along a tertiary path straight through transfer device 20 and right at transfer device 23 onto transfer line 9. As shown in other figures, the management system may be configured to direct totes to alternative destination 12 unless unavailable, in which case transfer device 24 will stack totes in dense storage 11.

In all examples above, different preferences and priorities may be given to the described routes. For instance, in FIG. 8 the secondary path for totes from consolidation area 4 may be along transfer line 9 rather than line 10, irrespective of whether conveyor line 6 is full. Similarly, totes travelling along transfer line 9 may be preferentially directed to dense storage 11 unless full, in which case they will be directed to alternative destination 12. The logic system may be modified and adapted as needed for any particular configuration of empty tote conveyor lines.

In some embodiments, an apparatus and a corresponding method performed by the apparatus, comprises multiple conveyor lines connecting multiple filling and emptying areas; a plurality of sensors configured to detect need for empty totes at the filling areas; one or more buffer components coupled to the conveyor lines; and a control circuit in communication with the sensors and the buffer components, the control circuit configured for output signaling to direct the empty totes according to detected need. The buffer component may comprise a buffer conveyor line connected to one or more conveyor line at one or more transfer points, a dense tote storage area coupled to the conveyor line, or other mechanism. The plurality of sensors may be the same or different, and in one example may be optical sensors that detects the presence or absence of a tote at specified locations.

Figure 9:
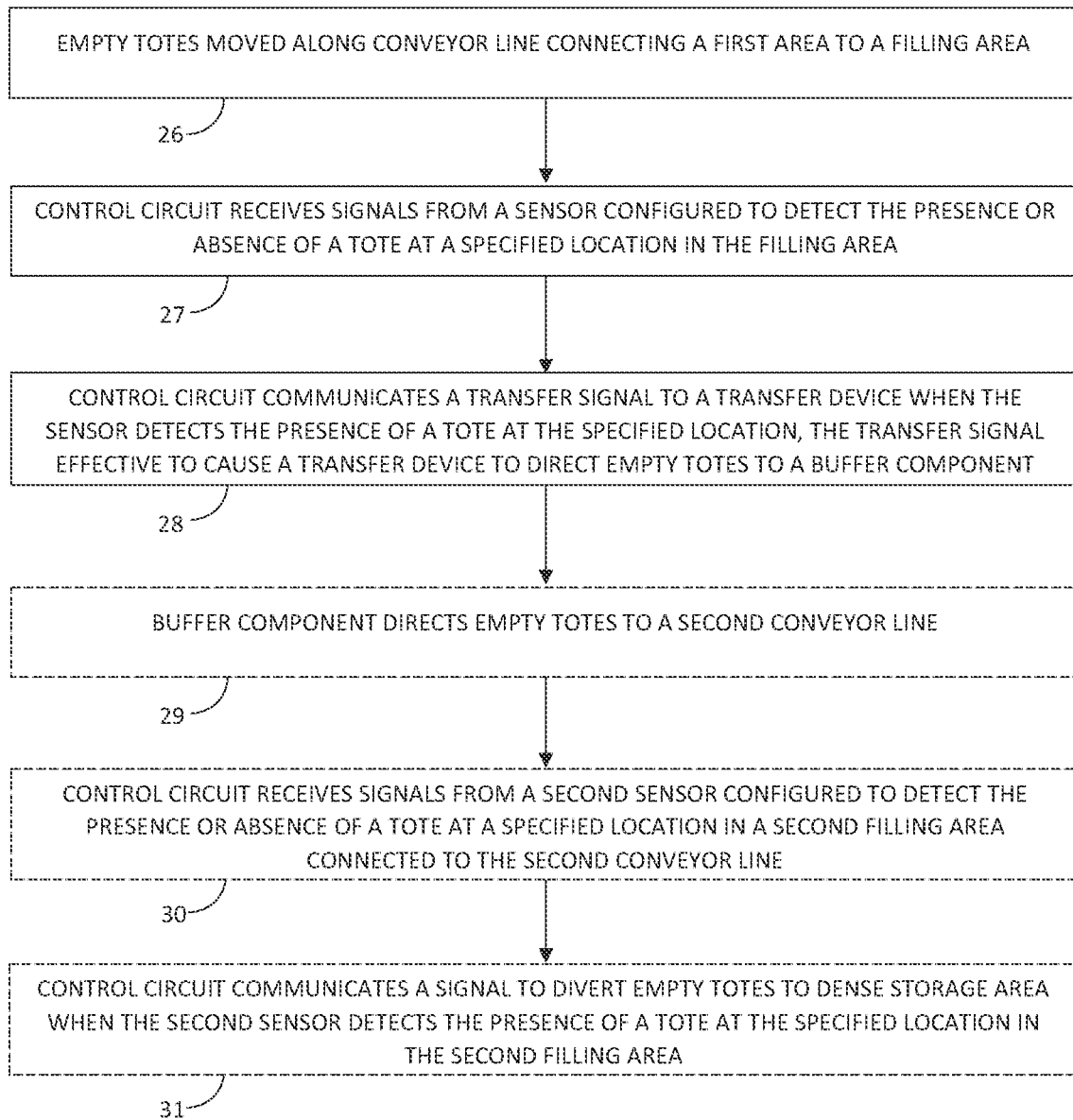
FIG. 9 is a flow chart illustrating a method of managing empty totes in accordance with several embodiments.

In some embodiments, a method carried out by the described systems is shown in FIG. 9. The process starts with empty totes being moved along a conveyor line that connects a first area to a filling area where the empty totes are to be filled (Step 26). A control circuit, such as the control circuit 17 shown in FIG. 1 or any other suitable control circuit, receives signals from a sensor located in the filling area (Step 27), the sensor being configured to detect the presence or absence of a tote at a specified location in the filling area. The sensor may alternatively be positioned outside the filling area and/or detect the presence or absence of a tote at a specified location along a path to the filling area. A plurality of sensors may also be positioned to detect totes at multiple locations. In response to signals received from the sensor, the control circuit communicates a transfer signal to a transfer device when the sensor detects the presence of a tote at the specified location, causing a transfer device to direct empty totes to a buffer component (Step 28). Optionally, the buffer component may direct empty totes to a second conveyor line (Step 29). Alternatively, the totes may be directed to a dense storage area or other area. Once empty totes are directed along a second conveyor line, the control circuit may optionally receive signals form a second sensor or group of sensors configured to detect the presence or absence of totes at a specified location or multiple specified locations in or leading to a second filling area connected to the second conveyor line (Step 30). Optionally, the control circuit may also communicate a signal to divert empty totes to a dense storage area if the second sensor or group of sensors detect totes at the one or more specified locations in or leading to the second filling area (Step 31).

Figure 10:
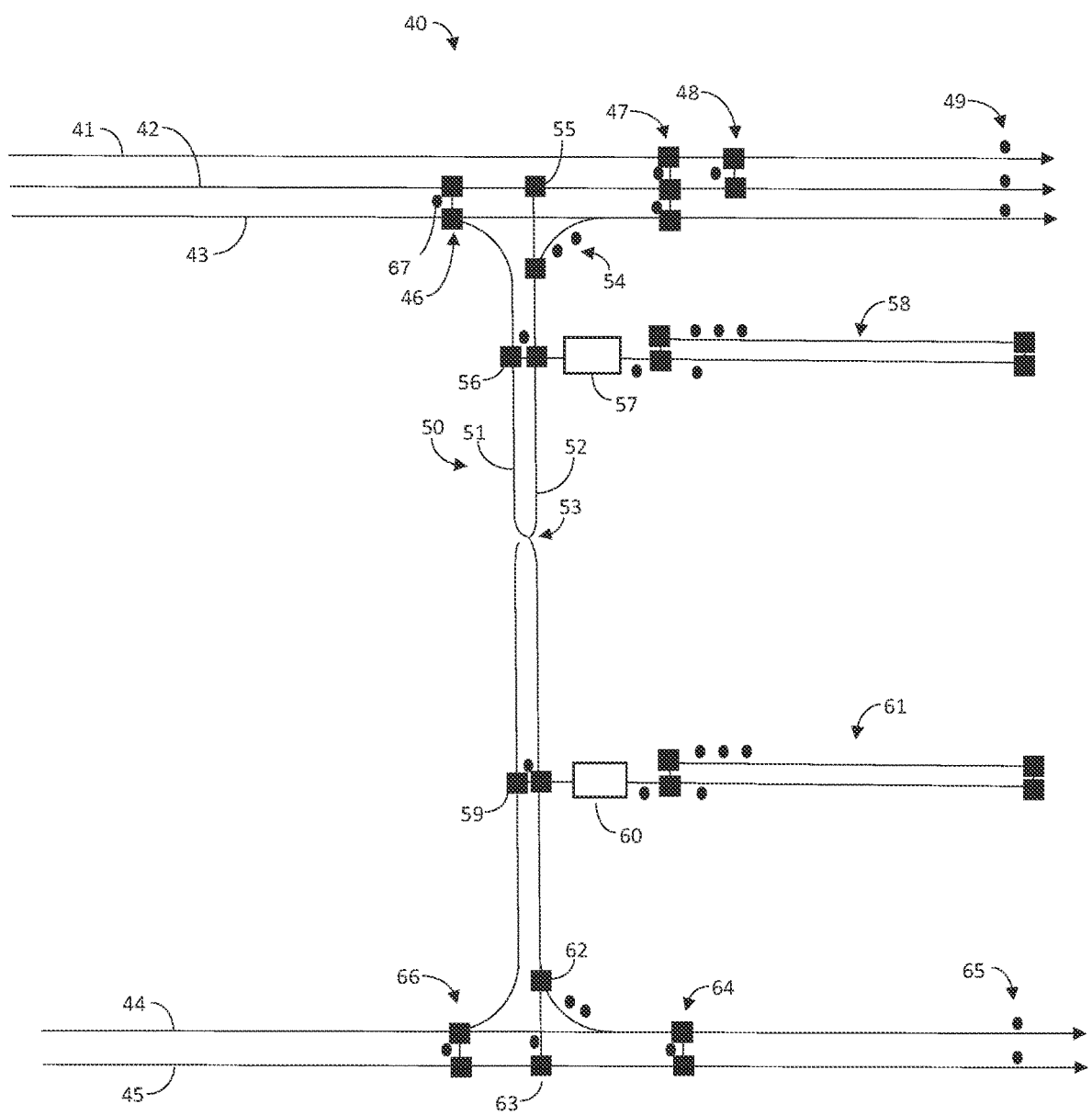
FIG. 10 is a detailed schematic of one example of a tote return system in accordance with some embodiments in which five picking areas are interconnected with five consolidation areas.

FIG. 10 is an overhead schematic diagram of one particular embodiment of the present invention comprising a system 40 of conveyors capable of moving empty totes from consolidation areas to picking areas. The system 40 is associated with a series of conveyors that move full totes from the picking areas to the consolidation areas, and is configured so that the system 40 is located at a vertical level that is different than the vertical level of the system of conveyors for full totes (i.e. above or below the conveyor lines for full totes). Conveyors are represented by lines, while transfer points are indicated by squares and sensors are indicated by dots. Conveyor lines 41, 42, and 43 are generally parallel and run continuously in the same direction. A transverse buffer line 46 connects conveyor lines 42 and 43 at a pair of pop-up right angle transfer devices to allow totes to be transferred in a single direction from conveyor line 42 to conveyor line 43. The buffer line 46 connects to conveyor line 43 at a ramp entrance to transfer line 51, so that totes on conveyor line 43 that arrive at buffer line 46 may continue along conveyor line 43 or be re-directed to transfer line 51. Totes moving along conveyor line 42 that reach buffer line 46 may continue along conveyor line 42 or be re-directed to either conveyor line 43 or transfer line 51 depending on the state of the two transfer devices associated with buffer line 46. A sensor 67 is positioned along buffer line 46 in order to alert a control circuit if buffer line 46 becomes jammed. Downstream of the transfer line, buffer line 47 connects conveyor lines 41, 42, and 43, running in a single direction (toward the top of FIG. 10) with pop-up right angle transfer devices that allow totes from conveyor line 43 to shift to conveyor lines 41 or 42. Buffer line 48 runs parallel to buffer line 47 and in the opposite direction, allowing transfer of totes from conveyor line 41 to conveyor line 42. Associated sensors alert the system when the buffer line is full and should not receive additional totes. A series of sensor devices 49 detect the presence or absence of totes near the picking areas associated with conveyor lines 41, 42, and 43, and are capable of sending signals to the control circuit indicating that totes should be directed to or away from a particular conveyor line based on need for empty totes at the picking area. Each line may have a plurality of sensors at the picking area, extending along a distance at the end of the conveyor that defines a maximum capacity for totes, with individual sensors spaced in order to alert the system when specific percentages of the maximum capacity have been reached.

On the opposite side of the system 40, conveyor lines 44 and 45 run generally parallel to lines 41, 42, and 43, and connect two additional consolidation areas and two additional picking areas. Buffer line 66 connects conveyor lines 44 and 45, and right-angle pop-up transfer devices at the connection points allow totes to be moved from conveyor line 45 to conveyor line 44 or transfer line 52. Buffer line 64 likewise allows movement of totes in the opposite direction, from conveyor line 44 to conveyor line 45. Sensors 65 detect the presence or absence of totes near the picking areas associated with conveyor lines 45, and are capable of sending signals to the control circuit indicating that totes should be directed to or away from a particular conveyor line based on need for empty totes at the picking area.

Connecting the two distinct groups of conveyor lines is the transfer device comprising transfer lines 51 and 52. The lines cross one another at a cross-over point 53 where transfer line 51 passes over transfer line 52 so that each line can receive totes from at least one conveyor line and feed into at least one other conveyor line in a manner that minimizes disruption along those lines. For instance, transfer line 51 has a curved entrance ramp at its beginning, where it connects to conveyor line 43, and at its end has a curved ramp merging with conveyor line 43. Alternatively, totes approaching the end of transfer line 51 may be redirected at transfer point 62 to conveyor line 45 via right angle pop-up transfer device 63. Similarly, totes from conveyor line 44 may be transferred along transfer line 52 to conveyor line 43 along ramp 54, or conveyor line 42 via transfer device 55. The transfer device 50, in combination with the various buffer lines, allow totes from the five consolidation areas associated with the five conveyor lines 41, 42, 43, 44, and 45 to be redistributed to other picking areas as needed to balance the availability of totes. When all of the picking areas have reached a specified capacity of totes, totes may be redirected to dense storage areas associated with the transfer device 50. Buffer line 56 connects transfer lines 51 and 52 near the first group of conveyor lines and leads to a bi-directional stacking device 57 that can either stack totes vertically for later use or send totes through a loop 58 which provides excess tote capacity while still leaving them readily available to re-enter one of the conveyor lines. Bi-directional stacking device 57 may receive and distribute totes from either of two directions. The system logic may be designed so that totes are first diverted to the loop structure 58, passing through the stacking device 57, and are only stacked in the stacking unit 57 when sensors associated with the loop 58 indicate that the loop is at or near its maximum capacity. Similarly, buffer line 59 connects transfer lines 51 and 52 near the second group of conveyor lines and allows totes to be diverted to bi-directional stacking device 60 and/or loop 61.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for distributing empty totes from consolidation areas to picking areas, the system comprising:
    a first conveyor line for conveying the empty totes, the first conveyor lines connecting a first consolidation area to a first picking area;
    a first sensor configured to detect partial and full empty tote capacity near the first picking area;
    a first buffer component coupled to the first conveyor line for conveying the empty totes from the first conveyor line; and
    a control circuit in communication with the first sensor and the first buffer component, the control circuit configured to:
    output signaling to direct the empty totes from the first consolidation area to the first picking area via the first conveyor line when the first plurality of sensors detects an absence of totes in at least one location proximate the first picking area; and
    output signaling to direct at least one empty tote to the first buffer component when the first plurality of sensors does not detect the absence of totes in the at least one location proximate the first picking area.

2. The system of claim 1, wherein the first buffer component comprises a tote storage buffer component.

3. The system of claim 1, further comprising:
    a second conveyor line connecting a second consolidation area to a second picking area;
    a second sensor configured to detect partial and full empty tote capacity near the second picking area; and
    a second buffer component coupled to the second conveyor line for conveying the empty totes from the second conveyor line to the first conveyor line.

4. The system of claim 3, wherein the first buffer component comprises a first buffer conveyor line connected to the first conveyor line at a first transfer point, and the second buffer component comprises a second buffer conveyor line connected to the second conveyor line at a second transfer point.

5. The system of claim 3, wherein the first and second buffer components are at least in part positioned at vertical levels that are different than vertical levels of the first conveyor line and the second conveyor line.

6. The system of claim 3,
    wherein the first sensor is positioned below the first conveyor line and the second sensor is positioned below the second conveyor line; and
    further comprising a third sensor in communication with the control circuit, the third sensor located proximate the first consolidation area and configured to signal the control circuit when the first conveyor line reaches a specified capacity of the empty totes.

7. The system of claim 6, wherein the first sensor, the second sensor, and the third sensor are each optical sensors that detect the presence or absence of the totes at specified locations.

8. The system of claim 3, wherein the first sensor is arranged and configured to indicate when an area near the first picking area is at less than 50% capacity, 50% capacity, 75% capacity, or 100% capacity.

9. The system of claim 8, wherein the first buffer component and second buffer component each connect to a stacker unit.

10. A system for distributing empty totes from a plurality of emptying areas, the system comprising:
- first and second conveyor lines, the first conveyor line connecting a first emptying area to a first filling area and the second conveyor line connecting a second emptying area to a second filling area, the first and second conveyor lines connected by a buffer line;
- a first sensor configured to detect a need for empty totes at the first filling area, and a second sensor configured to detect a need for empty totes at the second filling area;
- a control circuit in communication with the first and second sensors, the control circuit configured to signal at least one transfer device to move empty totes from one of the first and second conveyor lines in response to signals from the first and second; and
- at least a first overflow sensor configured to signal the control circuit when the first or second conveyor line reach a specified capacity of empty totes.

11. The system of claim 10, further comprising a stacking device connected to the at least one transfer line.

12. The system of claim 10, wherein the control circuit is configured to direct the totes from the first and second conveyor lines to at least one dense storage area when a signal from the first overflow sensor indicates that the first or second conveyor line reached the specified capacity of empty totes.

13. The system of claim 10, wherein the first and second conveyor lines each comprise one or more conveyor belts.

14. A method for distributing empty totes from a first area, the method comprising:
- moving empty totes along a first conveyor line coupled to a first buffer component, the first conveyor line connecting a first consolidation area to a first picking area, the first conveyor line comprising a first sensor configured to detect partial and full empty tote capacity near the first picking area, the first sensor including at least a first overflow sensor;
- signaling a control circuit via the first overflow sensor when the first conveyor line reaches a specified capacity of the empty totes;
- moving the empty totes along a second conveyor line coupled to a second buffer component, the second conveyor line connecting a second consolidation area to a second picking area, the second conveyor line coupled to a second sensor configured to detect partial and full empty tote capacity near the second picking area, the second sensor including at least a second overflow sensor;
- signaling the control circuit via the first overflow sensor when the first conveyor line reaches the specified capacity of the empty totes;
- receiving signals from the first sensor and the second sensor at the control circuit; and
- generating by the control circuit a control signal to direct the totes from at least one of the first conveyor line and the second conveyor line to a respective at least one of the first and second buffer components based on signals received from at least one of the first and second sensors.

15. The method of claim 14, wherein the control signal is a wireless signal.

16. The method of claim 14, further comprising generating a control signal to direct the totes from the first conveyor line to the second conveyor line in response to detecting an absence of totes by the second sensor.

17. The method of claim 14, wherein the first and second buffer components are each connected to a stacker unit.

18. The method of claim 14, wherein the first and second conveyor lines each comprise one or more conveyor belts.

* * * * *